(12) United States Patent
Yamazaki et al.

(10) Patent No.: US 7,225,355 B2
(45) Date of Patent: May 29, 2007

(54) FAULT-TOLERANT COMPUTER SYSTEM, RE-SYNCHRONIZATION METHOD THEREOF AND RE-SYNCHRONIZATION PROGRAM THEREOF

(75) Inventors: Shigeo Yamazaki, Tokyo (JP); Shigeyuki Aino, Tokyo (JP)

(73) Assignee: NEC Corporation, Tokyo (JP)

( * ) Notice: Subject to any disclaimer, the term of this patent is extended or adjusted under 35 U.S.C. 154(b) by 563 days.

(21) Appl. No.: 10/614,000

(22) Filed: Jul. 8, 2003

(65) Prior Publication Data

US 2004/0010789 A1    Jan. 15, 2004

(30) Foreign Application Priority Data

Jul. 12, 2002    (JP)    ............... 2002-204305

(51) Int. Cl.
 *G06F 11/00*    (2006.01)
(52) U.S. Cl. ......................... 714/12; 713/375
(58) Field of Classification Search ............... 714/12; 713/375
See application file for complete search history.

(56) References Cited

U.S. PATENT DOCUMENTS

| | | | |
|---|---|---|---|
| 3,864,670 A * | 2/1975 | Inoue et al. ............ | 714/12 |
| 5,020,024 A | 5/1991 | Williams | |
| 5,805,870 A * | 9/1998 | Browning .............. | 713/375 |
| 5,832,253 A * | 11/1998 | King et al. ............ | 713/375 |
| 5,872,907 A | 2/1999 | Griess et al. | |
| 5,875,320 A * | 2/1999 | Gu ....................... | 713/375 |
| 5,956,474 A | 9/1999 | Bissett et al. | |
| 6,141,770 A | 10/2000 | Fuchs et al. | |
| 6,175,930 B1 * | 1/2001 | Arimilli et al. ........ | 714/3 |
| 6,480,966 B1 * | 11/2002 | Rawson, III ........... | 713/400 |
| 6,519,710 B1 * | 2/2003 | Saunders et al. ....... | 713/500 |
| 6,757,847 B1 * | 6/2004 | Farkash et al. ......... | 714/39 |
| 6,950,956 B2 * | 9/2005 | Zerbe et al. ........... | 713/400 |
| 2006/0041785 A1 * | 2/2006 | Shimawaki ............. | 714/12 |

FOREIGN PATENT DOCUMENTS

| | | |
|---|---|---|
| EP | 1 029 267 B1 | 3/2002 |
| JP | 4-32955 A | 2/1992 |
| JP | H08-235015 A | 9/1996 |
| JP | 10-21104 A | 1/1998 |
| JP | 2000-200255 A | 7/2000 |
| JP | 2002-049501 A | 2/2002 |

\* cited by examiner

*Primary Examiner*—Bryce P. Bonzo
(74) *Attorney, Agent, or Firm*—Sughrue Mion, PLLC

(57) ABSTRACT

A lock-step synchronism fault-tolerant computer system includes a plurality of computing modules having a processor and a memory in which each computing module processes the same instruction string in synchronization with each other. When disagreement in a state of access to an external bus among the respective processors in each computing module is detected, if no fault is detected in the system including the respective computing modules, an interruption is notified to all of said processors. Synchronization among each computing module is recovered by adjusting timing of a response to an access which each processor executes by an interruption.

11 Claims, 4 Drawing Sheets

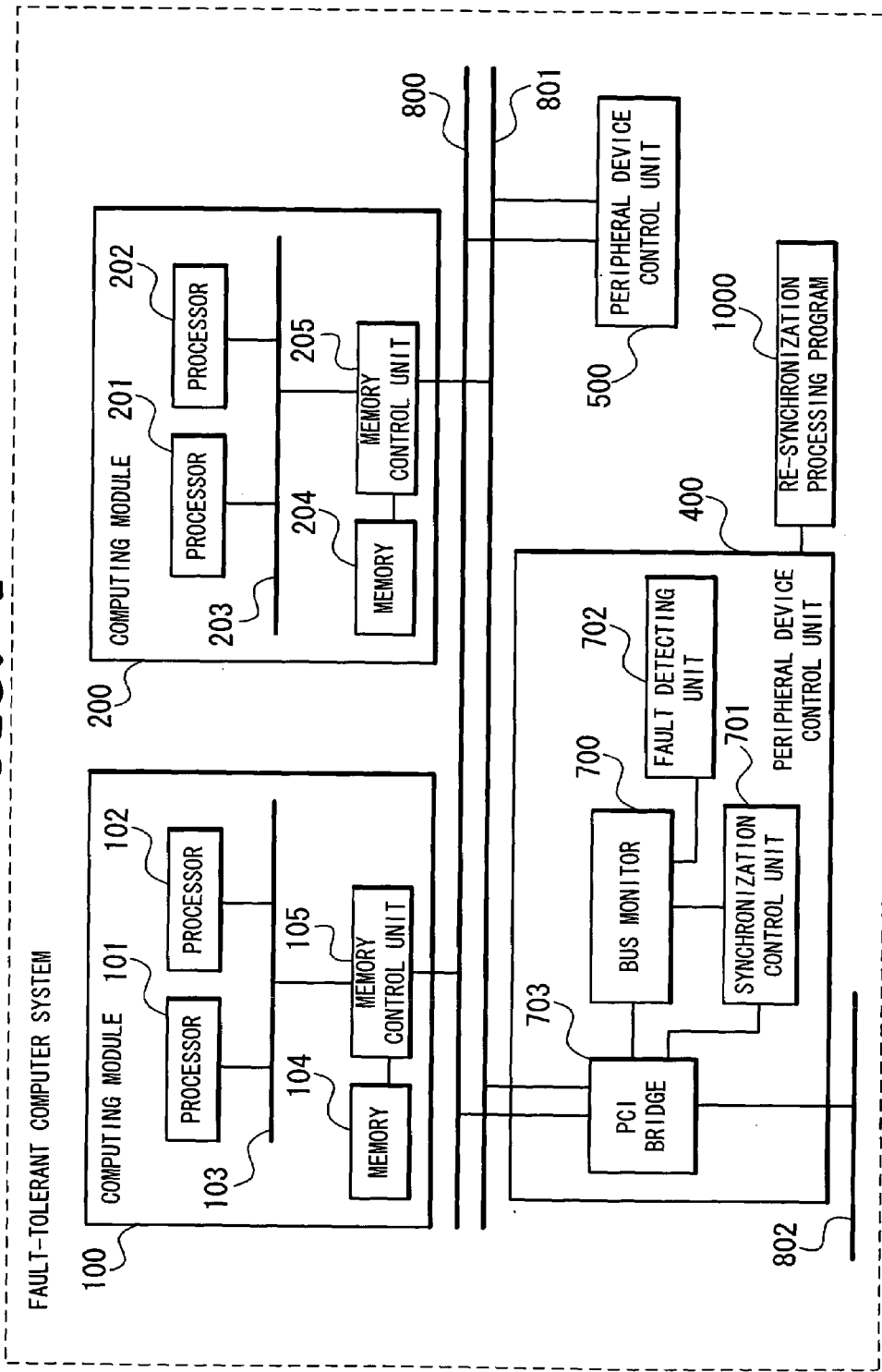

FAULT-TOLERANT COMPUTER SYSTEM, RE-SYNCHRONIZATION METHOD THEREOF AND RE-SYNCHRONIZATION PROGRAM THEREOF

BACKGROUND OF THE INVENTION

1. Field of the Invention

The present invention relates to a lock-step synchronism fault-tolerant computer system which processes the same instruction string in a totally the same manner by a plurality of computing modules in clock synchronization with each other. More particularly, it relates to a fault-tolerant computer system and a high-speed re-synchronization controlling method which realize speed-up of re-synchronization processing when a synchronism fault among computing modules occurs (lockstep comes off).

2. Description of the Related Art

With a conventional lock-step synchronism fault-tolerant computer system, when among a plurality of computing modules executing the same instruction string at the same time, a computing module is detected having a different output from that of other computing modules due to a failure or other external or internal factor, such countermeasures as follows are taken. In the following, a computing module detected failing to operate in synchronization with other computing modules will be referred to as a computing module in a step-out state.

More specifically, such a measure is taken of once cutting off a computing module whose lock-step comes off from an operational state and replacing the computing module as required according to a factor causing step-out or when replacement is not necessary, conducting re-initialization processing or the like according to the necessity to integrate the computing module into the operational state.

In conventional lock-step synchronism fault-tolerant computer system, at the time of this re-integration into the operational state, because irrespectively whether a computing module at the step-out state has been replaced or not, for the computing module to synchronize with other computing modules continuing with operation to conduct the same processing again, all the memory data held by the computing modules at the operational state are copied into a memory held by the computing module which is to be re-integrated at the time of its re-integration.

In conventional lock-step synchronism fault-tolerant computer syster, after executing replacement of a computing module at the step-out state, re-initialization processing according to a part causing step-out and the like, when integrating the computing module in question into the operational state again, computing modules at the operational state are halted for a long period of time.

More specifically, the conventional lock-step synchronism fault-tolerant computer system has a problem that while a computing module at the step-out state is subjected to re-integration processing, the entire fault-tolerant computer system has its operation halted for a long period of time (3 to 5 seconds in general or on the order of minutes).

The reason is that in order to integrate a computing module at the step-out state into the operational state, all the memory contents are copied all the time from the computing modules continuing with operation into the computing module to be re-integrated.

When operation of a normal computing module is continued during the copying processing, memory contents of the normal computing module have a possibility to be changed during the copying processing as well, so that copying can not be performed properly. For avoiding such a situation, a computing module at the operational state is temporarily stopped to prevent updating of its memory contents.

Since a memory capacity in a computing module today comes up to several Giga bytes, copying the entire memory region will require a long period of time.

In a lock-step synchronism fault-tolerant computer system, a step-out state among computing modules occurs due to various causes.

First case is a fixed failure occurring within a computing module. In this case, a computing module having a failure should be replaced and when integrating the computing module to be replaced into an operational system, all the data in a memory of a computing module at the operational state needs to be copied.

In a lock-step synchronism fault-tolerant computer system, a step-out state may occur because, in addition to the above-described fixed failure, computing modules operate at different timing due to difference in manufacturing of each unit in a computing module although its operation is normal or because of an automatically correctable intermittent failure of memory caused by effects of α-ray or the like.

In these cases, since a fixed failure occurs not in a computing module itself, the module fundamentally needs no replacement, and by again synchronizing its processing with that of other computing modules in operation to integrate the computing module in question, the entire fault-tolerant computer system can be restored to a normal operation state.

SUMMARY OF THE INVENTION

An object of the present invention is to provide a fault-tolerant computer system, a re-synchronization method thereof and a re-synchronization program thereof which enable a computing module whose lock-step comes off due to other causes than a fixed failure to be integrated again into the operational state at a higher speed than by a conventional system, thereby drastically reducing time of temporary halt of the system operation caused by the integration processing.

Another object of the present invention is to provide a fault-tolerant computer system, a re-synchronization method thereof and a re-synchronization program thereof which realize improvement of availability of the system by the reduction of time for the above-described re-integration processing.

According to the first aspect of the invention, a lock-step synchronism fault-tolerant computer system including a plurality of computing modules having a processor and a memory in which each computing module processes the same instruction string in synchronization with each other, wherein when detecting disagreement in a state of access to an external bus among respective the processors in each the computing module, if no fault is detected in the system including each the computing module, synchronization among each the computing module is recovered by adjusting timing of a response to an access which each the processor executes as a synchronization control instruction by an interruption.

In the preferred construction, the fault-tolerant computer system further comprises a fault detector which monitors existence/non-existence of a fault in the entire system;

a bus monitor which monitors an access of the processor in each the computing module to the external bus and when detecting disagreement in output among the respective computing modules, if no fault is detected by the fault detector, notifying an interruption to each the processor, and a synchronization controller which re-synchronizes each computing module by adjusting timing of a response to an access from each the processor which is caused by the interruption.

In another preferred construction, the bus monitor, when detecting disagreement in output among the respective computing modules, if no fault is detected by the fault detector, interrupts each the processor with a predetermined task, which is a task of executing an access to a predetermined resource in the synchronization controller, to re-synchronizing the computing modules, and the synchronization controller transmits a response to all the computing modules simultaneously, when receiving accesses to the resource from all the processors.

In another preferred construction, a plurality of pairs of the bus monitor, the fault detector and the synchronization controller are provided.

In another preferred construction, the bus monitor, the fault detector and the synchronization controller are provided in a peripheral device control unit which controls a peripheral device and connected to the external bus in the computing module through a PCI bridge.

According to the second aspect of the invention, a re-synchronization method in a lock-step synchronism fault-tolerant computer system including a plurality of computing modules having a processor and a memory in which each computing module processes the same instruction string in synchronization with each other, comprising the steps of when detecting disagreement in a state of access to an external bus among respective the processors in each the computing module, if no fault is detected in the system including each the computing module, generating an interruption to all of the processors, and causing each the processor to execute a synchronization control instruction to adjust timing of a response to an access from each processor, thereby causing each computing module to resume operation in synchronization.

In the preferred construction, the re-synchronization method further comprising the steps of detecting existence/non-existence of a fault in the entire system including each the computing module, monitoring an access of the processor in each the computing module to the external bus, when detecting disagreement in output among the respective computing modules, if no fault is detected in the system, notifying an interruption to each the processor, and causing each the processor to execute the clock synchronization control instruction to adjust timing of a response to an access from each processor, thereby causing each computing module to resume operation in synchronization.

In another preferred construction, the re-synchronization method further comprising the steps of when detecting disagreement in output among the respective computing modules, if no fault is detected in the system, interrupts each the processor with a predetermined task for re-synchronizing the respective computing modules which is a task of executing an access to a predetermined resource;

queuing access to the resource from each processor, and responding to the accesses from all the computing modules simultaneously when all the accesses from the processors are received.

According to another aspect of the invention, a re-synchronization program for executing re-synchronization processing of a lock-step synchronism fault-tolerant computer system including a plurality of computing modules having a processor and a memory in which each computing module processes the same instruction string in synchronization with each other, comprising the functions of when detecting disagreement in a state of access to an external bus among respective the processors in each the computing module, if no fault is detected in the system including each the computing module, generating an interruption to all of the processors, and causing each the processor to execute a clock synchronization control instruction to adjust timing of a response to an access from each processor, thereby causing each computing module to resume operation in synchronization.

In the preferred construction, the re-synchronization program further comprises the functions of detecting existence/non-existence of a fault in the entire system including each the computing module, monitoring an access of the processor in each the computing module to the external bus, when detecting disagreement in output among the respective computing modules, if no fault is detected in the system, notifying an interruption to each the processor, and causing each the processor to execute the synchronization control instruction to adjust timing of a response to an access from each processor, thereby causing each computing module to resume operation in synchronization.

In another preferred construction, the re-synchronization program further comprises the functions of when detecting disagreement in output among the respective computing modules, if no fault is detected in the system, interrupts each the processor with a predetermined task for re-synchronizing the respective computing modules which is a task of executing an access to a predetermined resource;

queuing access to the resource from each processor, and responding to the accesses from all the computing modules simultaneously when all the accesses from the processors are received.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 4 is a block diagram showing a structure of a fault-tolerant computer system according to a third mode of implementation of the present invention.

DESCRIPTION OF THE PREFERRED EMBODIMENT

The preferred embodiment of the present invention will be discussed hereinafter in detail with reference to the accompanying drawings. In the following description, numerous specific details are set forth in order to provide a through understanding of the present invention. It will be obvious, however, to those skilled in the art that the present invention may be practiced without these specific details. In other instance, well-known structures are not shown in detail in order to unnecessary obscure the present invention.

Figure 1:
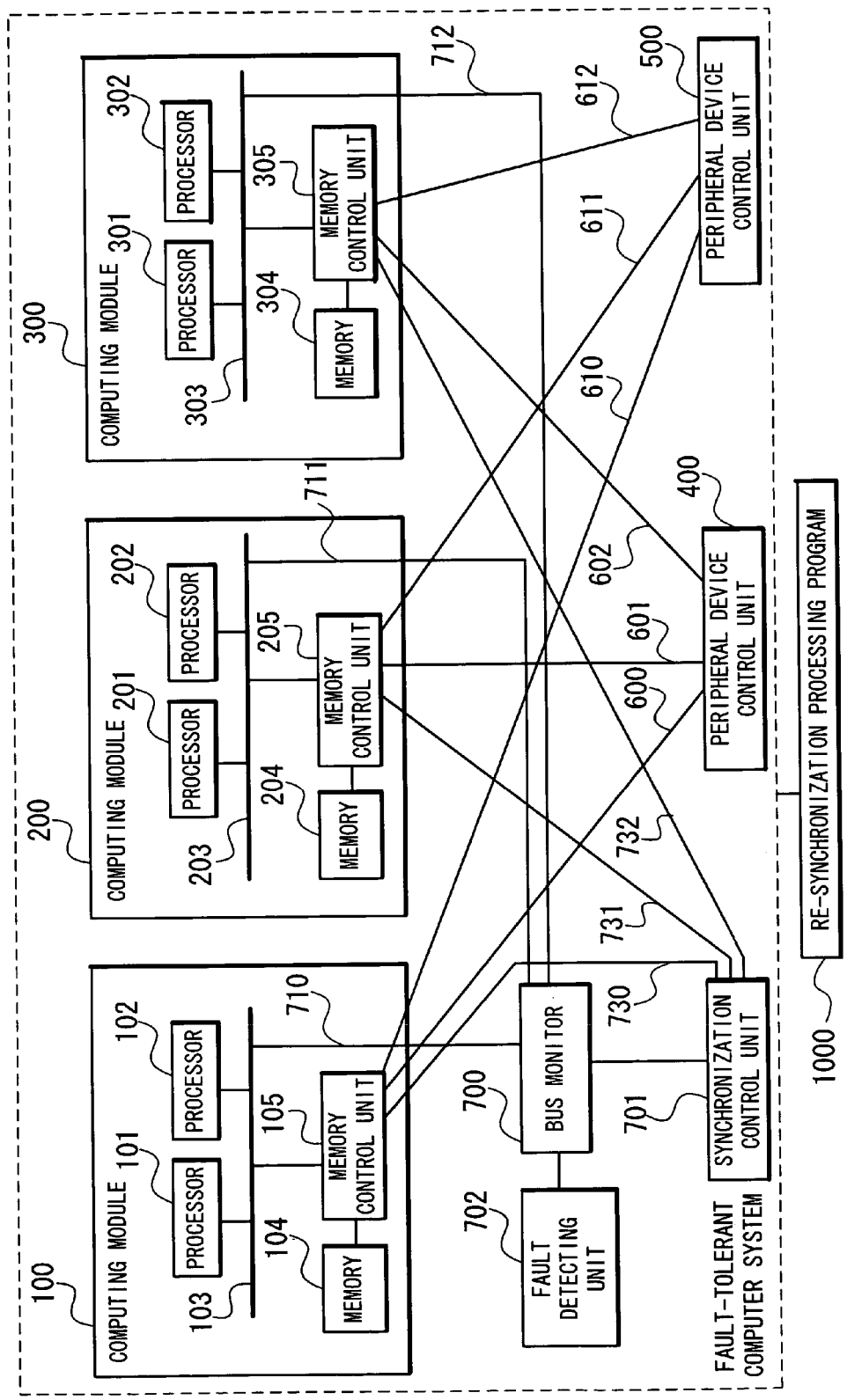
FIG. 1 is a block diagram showing a structure of a fault-tolerant computer system according to a first mode of implementation of the present invention.

Modes of implementation of the present invention will be described in detail with reference to the drawings in the following. FIG. 1 is a block diagram showing a structure of a lock-step synchronism fault-tolerant computer system according to a first mode of implementation of the present invention.

With reference to FIG. 1, the fault-tolerant computer system according to the present mode of implementation includes a plurality of computing modules 100, 200 and 300, each of which computing modules 100, 200 and 300 processes the same instruction string in clock synchronization with each other. The fault-tolerant computer system compares a processing result of each computing module. Even when one computing module has a failure, the processing can be continued by the remaining computing modules.

The respective computing modules 100, 200 and 300 include a plurality of processors 101 and 102, 201 and 202, and 301 and 302, processor external buses 103, 203 and 303, memories 104, 204 and 304 and memory control units 105, 205 and 305, respectively.

In addition, the computing modules 100, 200 and 300 are connected to peripheral device control units 400 and 500 for controlling a peripheral device through the memory control units 105, 205 and 305 and interface signal lines 600, 601, 602, 610, 611 and 612.

The above-described fault-tolerant computer system further includes a bus monitor 700, a fault detecting unit 702 and a synchronization control unit 701.

The bus monitor 700 monitors an access of a processor of each computing module to the external bus. The bus monitor 700 is connected to the processor external buses 103, 203 and 303 of the respective computing modules 100, 200 and 300 through interface signal lines 710, 711 and 712.

The fault detecting unit 702 monitors existence/non-existence of a fault in the entire system including the respective computing modules.

The synchronization control unit 701, which is connected to each computing module, adjusts timing of a response to an access from each computing module to cause each computing module to resume operation in clock synchronization. The synchronization control unit 701 is connected to the memory control units 105, 205 and 305 of the respective computing modules 100, 200 and 300 through interface signal lines 730, 731 and 732.

Next, description will be made of operation of thus structured fault-tolerant computer system according to the present mode of implementation.

The fault detecting unit 702 monitors existence/non-existence of a fixed fault in the entire fault-tolerant computer system including the respective computing modules 100, 200 and 300 and the peripheral device control units 400 and 500. Then, the fault detecting unit 702 notifies a monitoring result to the bus monitor 700.

The bus monitor 700, which is connected to the processor external buses 103, 203 and 303 of the respective computing modules 100, 200 and 300 through the interface signal lines 710, 711 and 712, compares external access control signals of the respective processors 101, 102, 201, 202, 301 and 302 to monitor whether the respective processors 101, 102, 201, 202, 301 and 302 access the external buses 103, 203 and 303 in clock synchronization with each other at the same timing or not.

In a case where by the above-described monitoring operation, the bus monitor 700 detects any of the processors 101, 102, 201, 202, 301 and 302 operating at different timing from timing of the others, when the fault detecting unit 702 detects a fixed fault nowhere in the fault-tolerant computer system, the bus monitor 700 detects that the step-out is not caused by a fault. The result is notified to all the computing modules 100, 200 and 300 through the interface signal lines 710, 711 and 712 to generate an interruption to each processor. In addition, the bus monitor 700 at the same time shifts to a break mode of monitoring the external buses 103, 203 and 303 of the processors.

Here, the bus monitor 700 monitors all the accesses to the external buses 103, 203 and 303 including a memory access from the processor and when detecting lack of synchronization in operation among the computing modules, instantaneously interrupts all the processors 101, 102, 201, 202, 301 and 302 to interrupt the processing, so that at the time of the interruption is generated, the contents of the memories 104, 204 and 304 in the respective computing modules 100, 200 and 300 are all coincident with each other.

In the following, description will be made of specific contents of operation of the fault-tolerant computer system according to the present mode of implementation with reference to FIG. 2.

When the bus monitor 700 detects lack of synchronization in operation among the computing modules (Step 201 in FIG. 2), the detection is notified through the interface signal lines 710, 711 and 712 to generate an interruption to each processor.

Figure 2:
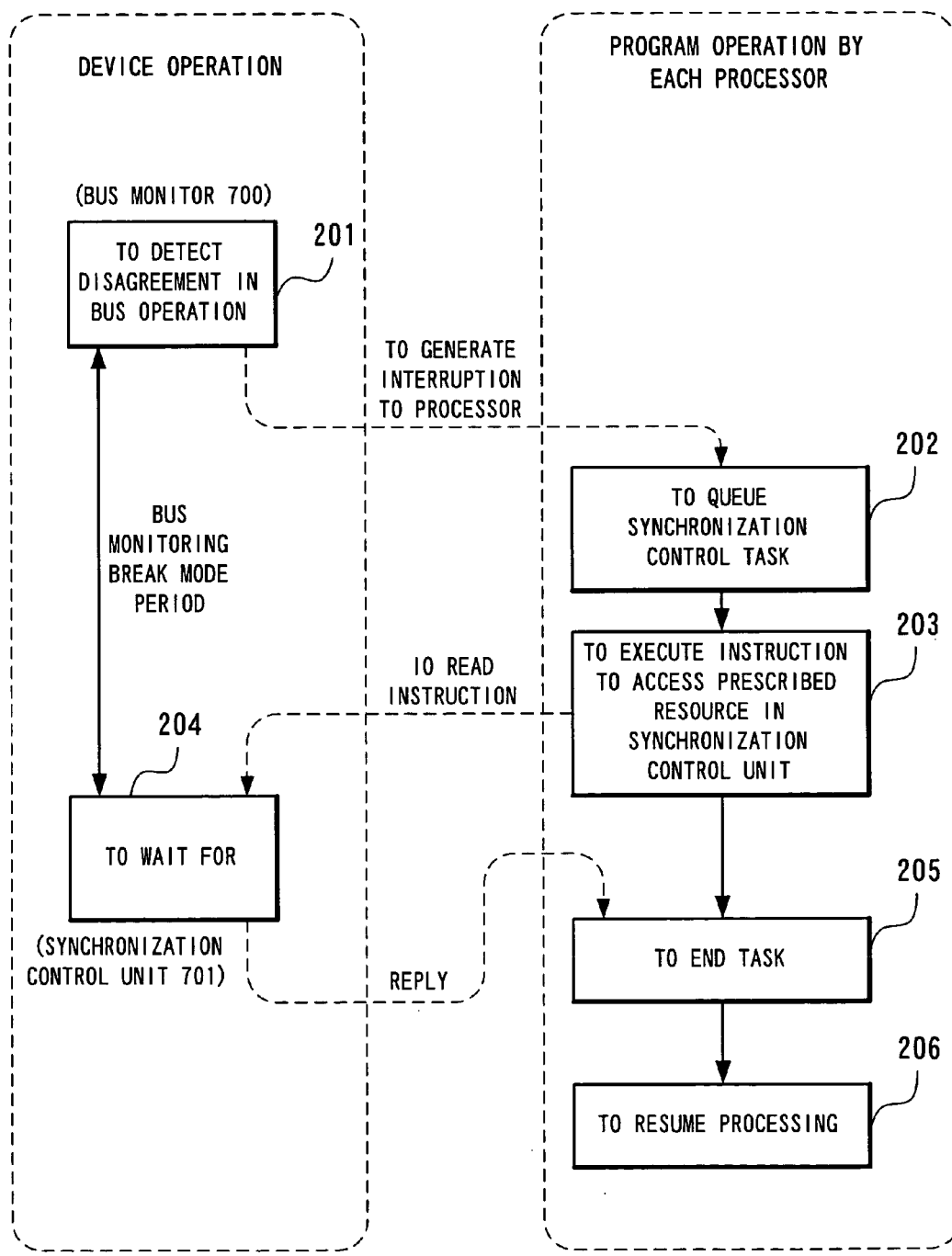
FIG. 2 is a diagram for use in explaining the contents of re-synchronization processing of the fault-tolerant computer system.

All the processors 101, 102, 201, 202, 301 and 302 are at the relevant interruption processing and queue a synchronization control task intended to obtain re-synchronization of clock synchronization operation among the respective computing modules 100, 200 and 300 to the top of a ready queue as a highest-priority task (Step 202 in FIG. 2).

The synchronization control task has a function of executing an instruction to access a resource specially prescribed in the synchronization control unit 701. Thereafter, when the above-described synchronization control task is shifted to an execution state by an OS, the task executes the instruction to access the prescribed resource in the synchronization control unit 701 (Step 203 in FIG. 2).

At this time point, an access to the prescribed resource from a computing module in the step-out state and an access to the prescribed resource from other computing modules in the lock-step state are naturally transmitted to the synchronization control unit 701 with a time delay.

Upon detecting an access from the computing modules 100, 200 and 300 to the internal resource specially prescribed, the synchronization control unit 701, when the access is the first, refrains from returning a response to the relevant computing module and waits for accesses from all of the other computing modules to come (Step 204 in FIG. 2). When the accesses from all the computing modules 100, 200 and 300 are transmitted, return a response to the accesses simultaneously to all the computing modules 100, 200 and 300.

In response to the response from the synchronization control unit 701, all the processors in the respective computing modules 100, 200 and 300 end the execution of the synchronization control task (Step 205 in FIG. 2). Thereafter, all the processors continue ordinary program operation (Step 206 in FIG. 2).

The operation described in the foregoing enables the computing modules 100, 200 and 300 to again continue with their operation in clock synchronization with each other. At this time, as described above, since re-synchronization processing is executed before the contents of the memories 104, 204 and 304 in the computing modules 100, 200 and 300 lose coincidence, after starting the operation again in clock synchronization, all the computing modules 100, 200 and 300 are again allowed to execute the same instruction string at the same timing. This eliminates the need of copying memory for re-synchronization which is required in a conventional fault-tolerant computer system, thereby enabling high-speed execution of re-synchronization processing.

Figure 3:
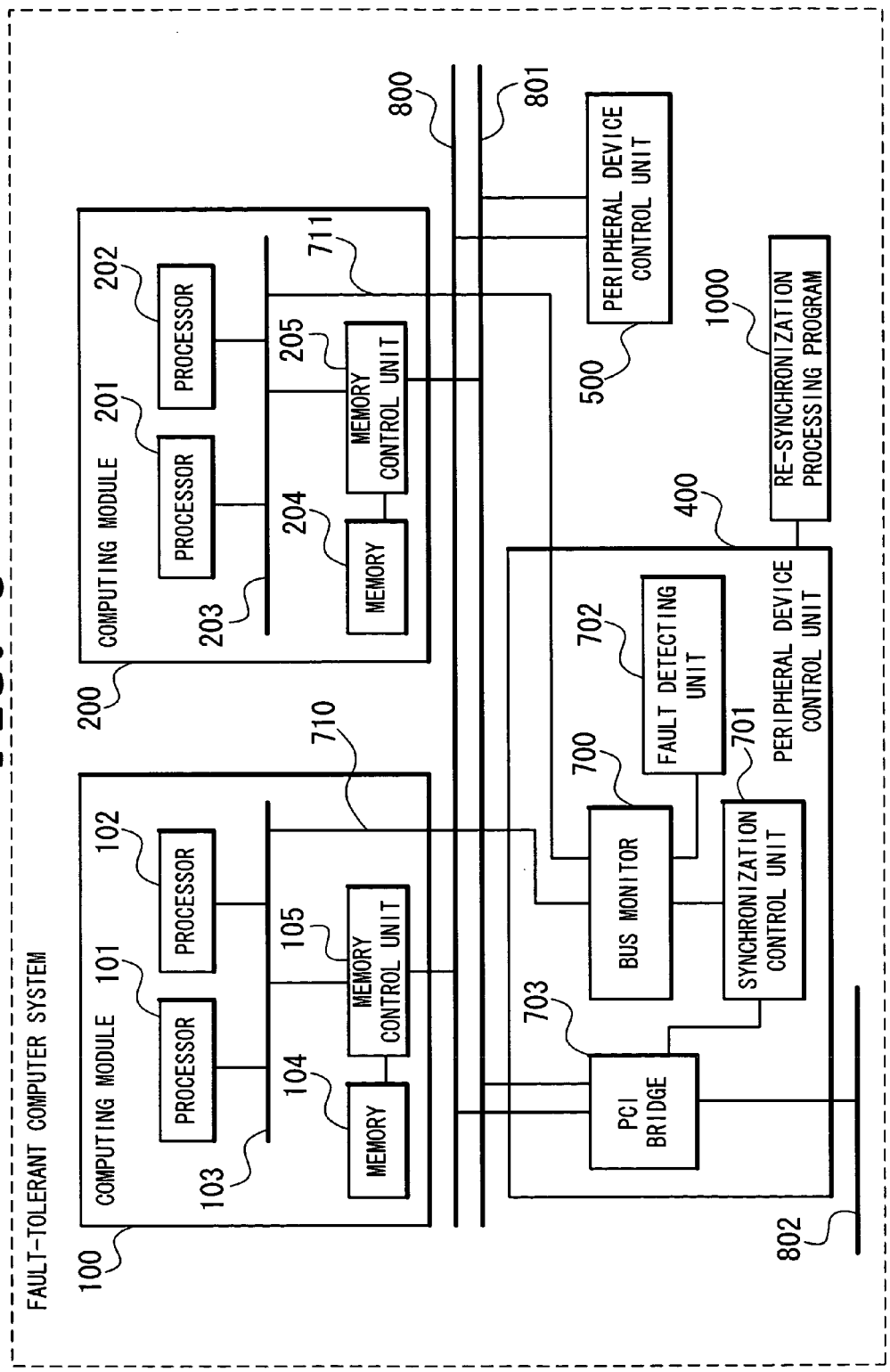
FIG. 3 is a block diagram showing a structure of a fault-tolerant computer system according to a second mode of implementation of the present invention.

FIG. 3 is a block diagram showing a structure of a fault-tolerant computer system according to a second mode of implementation of the present invention. With reference to FIG. 3, the fault-tolerant computer system according to the present mode of implementation of the present invention is structured to include a plurality of computing modules 100 and 200 each having a processor and a memory and a plurality of peripheral device control units 400 and 500 each having a PCI bridge 703. Each of the computing modules 100 and 200 processes the same instruction string in clock synchronization with each other. The fault-tolerant computer system compares a processing result of each computing module. Even when one computing module has a failure, the processing can be continued by the remaining computing modules. In addition, each of the peripheral device control units 400 and 500 is structured to be multiplexed by software control to enable, even when one peripheral device control unit develops a fault, processing to be continued using the other peripheral device control unit.

Each peripheral device control unit 400 includes the PCI bridge 703 connected to memory control units 105 and 205 in the respective computing modules 100 and 200 through a PCI for establishing connection with a peripheral device, a bus monitor 700 for monitoring an access of each processor in each of the computing modules 100 and 200 to an external bus, a fault detecting unit 702 for monitoring existence/non-existence of a fault in the entire fault-tolerant computer system including the computing modules 100 and 200, and a synchronization control unit 701 connected to each computing module through the PCI bridge 703 for adjusting timing of a response to an access from each computing module to recover clock synchronization of each computing module.

Although not illustrated in the figure, the peripheral device control unit 500 also has the above-described respective components similarly to the peripheral device control unit 400.

The lock-step synchronism fault-tolerant computer system structured according to the present mode of implementation ordinarily monitors clock synchronization operation of each of the computing modules 100 and 200 and controls a peripheral device by using the peripheral device control unit 400. When a failure occurs in the peripheral device control unit 400, conduct the same processing by switching the use to the peripheral device control unit 500.

In the present mode of implementation, execution of an instruction to access the prescribed resource in the synchronization control unit 701 which is shown in FIG. 2 (Step 203 in FIG. 2) is realized by the execution of a read instruction to a register in the synchronization control unit 701 in the peripheral device control unit 400 and the read instruction is transmitted to the synchronization control unit 701 through PCI buses 800 and 801 and the PCI bridge 703 and its response is transmitted to each of the computing modules 100 and 200 through the same route.

Content of the re-synchronization processing in the present mode of implementation is the same as that shown in FIG. 2.

In addition, although shown in the present mode of implementation is an embodiment in which two computing modules exist, structure having three computing modules as shown in the first mode of implementation illustrated in FIG. 1 or structure having four or more modules function in the same manner.

FIG. 4 is a block diagram showing a structure of a fault-tolerant computer system according to a third mode of implementation of the present invention.

Shown in the present mode of implementation is a structure in which a bus monitor 700 is connected to computing modules 100 and 200 through a PCI bridge 703.

In the present mode of implementation, monitoring of external buses 103 and 203 of the respective processors is executed by a signal (PCI bus protocol) transmitted to the bus monitor 700 through memory control units 105 and 205 of the respective computing modules 100 and 200, PCI buses 800 and 801 and the PCI bridge 703. In addition, transmission of an interruption from the bus monitor 700 to each computing module is executed through a route reverse to the above-described route.

Content of the re-synchronization processing in the present mode of implementation is the same as that shown in FIG. 2.

Although in the second and third modes of implementation, the respective computing modules and the bus monitor and the like are connected using a PCI, the connection between these components may be established using an interface of other standard such as a PCI-X or a exclusive interface not standardized for general purposes, which affects none of the effects of the present invention.

In the fault-tolerant computer system of the present invention, the function of each unit for executing re-synchronization processing can be realized not only by hardware but also by loading a re-synchronization processing program 1000 which executes the function of each of the above-described units into a memory of a computer processing device to control the computer processing device. The res-synchronization processing program 1000 is stored in a magnetic disk, a semiconductor memory or other recording medium and loaded from the recording medium into the computer processing device to control operation of the computer processing device, thereby realizing each of the above-described functions.

Although the present invention has been described with respect to the preferred modes of implementation in the foregoing, the present invention is not necessarily limited to the above-described modes of implementation but realized in various forms within the scope of its technical idea.

Although shown in each of the above-described modes of implementation is the structure in which each computing module has two processors, structure having one processor or three or more processors functions in completely the same manner.

In addition, although shown in each of the modes of implementation is a case where the respective processors share one external bus and connected on the same bus, neither, for example, a structure in which a plurality of processors are connected in the form of asterism to a memory control unit nor a structure in which processors forming one computing modules are physically put on a plurality of boards affects the effects of the present invention.

As described in the foregoing, the present invention attains the following effects.

First effect is enabling a certain computing module in a fault-tolerant computer system, when it comes off from the lock-step state due to other causes than a fixed failure, to be restored to the lock-step state in an extremely short period of time.

The reason is that at an initial stage of generation of step-out, when a memory in each computing module is yet to disagree with each other, the bus monitor generates an interruption to a processor to preferentially execute a task of executing an instruction string for controlling re-synchronization, thereby recovering synchronization without copying memory.

Second effect is improving availability of the fault-tolerant computer system. The reason is that a halt time period of the entire system can be drastically reduced by significantly speeding up time for re-integration when lock-step comes off.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A lock-step synchronism fault-tolerant computer system including a plurality of computing modules having a processor and a memory in which each computing module processes the same instruction string in synchronization with each other, wherein
   when detecting disagreement in a state of access to an external bus among respective said processors in each said computing module, if no fault is detected in the system including each said computing module, synchronization among each said computing module is recovered by adjusting timing of a response to an access which each said processor executes as a synchronization control instruction by an interruption.

2. The fault-tolerant computer system as set forth in claim 1, further comprising:
   a fault detector which monitors existence/non-existence of a fault in the entire system;
   a bus monitor which monitors an access of the processor in each said computing module to the external bus and when detecting disagreement in output among the respective computing modules, if no fault is detected by said fault detector, notifying an interruption to each said processor, and
   a synchronization controller which re-synchronizes each computing module by adjusting timing of a response to an access from each said processor which is caused by said interruption.

3. The fault-tolerant computer system as set forth in claim 2, wherein
   said bus monitor, when detecting disagreement in output among the respective computing modules, if no fault is detected by said fault detector, interrupts each said processor with a predetermined task, which is a task of executing an access to a predetermined resource in said synchronization controller, to re-synchronizing the computing modules, and
   said synchronization controller transmits a response to all the computing modules simultaneously, when receiving accesses to said resource from all the processors.

4. The fault-tolerant computer system as set forth in claim 2, wherein
   a plurality of pairs of said bus monitor, said fault detector and said synchronization controller are provided.

5. The fault-tolerant computer system as set forth in claim 2, wherein
   said bus monitor, said fault detector and said synchronization controller are provided in a peripheral device control unit which controls a peripheral device and connected to the external bus in said computing module through a PCI bridge.

6. A re-synchronization method in a lock-step synchronism fault-tolerant computer system including a plurality of computing modules having a processor and a memory in which each computing module processes the same instruction string in synchronization with each other, comprising the steps of:
   when detecting disagreement in a state of access to an external bus among respective said processors in each said computing module, if no fault is detected in the system including each said computing module, generating an interruption to all of said processors, and
   causing each said processor to execute a synchronization control instruction to adjust timing of a response to an access from each processor, thereby causing each computing module to resume operation in synchronization.

7. The re-synchronization method as set forth in claim 6, further comprising the steps of:
   detecting existence/non-existence of a fault in the entire system including each said computing module, monitoring an access of the processor in each said computing module to the external bus,
   when detecting disagreement in output among the respective computing modules, if no fault is detected in the system, notifying an interruption to each said processor, and
   causing each said processor to execute the clock synchronization control instruction to adjust timing of a response to an access from each processor, thereby causing each computing module to resume operation in synchronization.

8. The re-synchronization method as set forth in claim 7, further comprising the steps of:
   when detecting disagreement in output among the respective computing modules, if no fault is detected in the system, interrupts each said processor with a predetermined task for re-synchronizing the respective computing modules which is a task of executing an access to a predetermined resource;
   queuing access to said resource from each processor, and
   responding to said accesses from all the computing modules simultaneously when all the accesses from said processors are received.

9. A re-synchronization program for executing re-synchronization processing of a lock-step synchronism fault-tolerant computer system including a plurality of computing modules having a processor and a memory in which each computing module processes the same instruction string in synchronization with each other, comprising the functions of:
- when detecting disagreement in a state of access to an external bus among respective said processors in each said computing module, if no fault is detected in the system including each said computing module, generating an interruption to all of said processors, and
- causing each said processor to execute a clock synchronization control instruction to adjust timing of a response to an access from each processor, thereby causing each computing module to resume operation in synchronization.

10. The re-synchronization program as set forth in claim 9, further comprising the functions of:
- detecting existence/non-existence of a fault in the entire system including each said computing module, monitoring an access of the processor in each said computing module to the external bus,
- when detecting disagreement in output among the respective computing modules, if no fault is detected in the system, notifying an interruption to each said processor, and
- causing each said processor to execute the synchronization control instruction to adjust timing of a response to an access from each processor, thereby causing each computing module to resume operation in synchronization.

11. The re-synchronization program as set forth in claim 10, further comprising the functions of:
- when detecting disagreement in output among the respective computing modules, if no fault is detected in the system, interrupts each said processor with a predetermined task for re-synchronizing the respective computing modules which is a task of executing an access to a predetermined resource;
- queuing access to said resource from each processor, and
- responding to said accesses from all the computing modules simultaneously when all the accesses from said processors are received.

* * * * *